United States Patent
Yang et al.

(10) Patent No.: US 9,851,832 B2
(45) Date of Patent: Dec. 26, 2017

(54) DISPLAY PANEL, DRIVING METHOD THEREOF AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Lei Wang, Beijing (CN); Chunlei Wang, Beijing (CN); Yingming Liu, Beijing (CN); Xiaobo Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 268 days.

(21) Appl. No.: 14/435,748

(22) PCT Filed: Sep. 1, 2014

(86) PCT No.: PCT/CN2014/085683
§ 371 (c)(1),
(2) Date: Apr. 15, 2015

(87) PCT Pub. No.: WO2015/158097
PCT Pub. Date: Oct. 22, 2015

(65) Prior Publication Data
US 2016/0299614 A1    Oct. 13, 2016

(30) Foreign Application Priority Data
Apr. 14, 2014    (CN) .......................... 2014 1 0149104

(51) Int. Cl.
*G09G 5/00*    (2006.01)
*G06F 3/041*    (2006.01)
(Continued)

(52) U.S. Cl.
CPC ...... *G06F 3/0416* (2013.01); *G02F 1/136209* (2013.01); *G02F 1/136286* (2013.01);
(Continued)

(58) Field of Classification Search
USPC ......................................................... 345/174
See application file for complete search history.

(56) References Cited

U.S. PATENT DOCUMENTS

2005/0275610 A1* 12/2005 Roh ..................... G09G 3/3614
345/88
2011/0096251 A1    4/2011 Son et al.
(Continued)

FOREIGN PATENT DOCUMENTS

CN    102937852 A    2/2013
CN    102955635 A    3/2013
(Continued)

OTHER PUBLICATIONS

1st office action issued in corresponding Chinese application No. 201410149104.9 dated May 4, 2016.
(Continued)

*Primary Examiner* — William Boddie
*Assistant Examiner* — Leonid Shapiro
(74) *Attorney, Agent, or Firm* — Nath, Goldberg & Meyer; Joshua B. Goldberg

(57) ABSTRACT

The present invention relates to the field of display, particularly to a display panel, a driving method thereof and a display device. The display panel comprises an array substrate provided with first electrodes and second electrode arranged in a same layer and a color filter substrate provided (Continued)

with third electrodes. The first electrodes and the second electrodes are alternately arranged in parallel at intervals and electrically isolated from each other. The second electrodes and the third electrodes are arranged correspondingly in space. The present invention has the following beneficial effects: by performing rectangular segmentation on the original plate-shaped common electrodes, the display panel ensures that common electrodes during display and driving electrodes during touch are electrically isolated from each other; in addition, as the diving electrodes are connected by redundant data lines, a display device comprising the display panel has a good image display effect and a higher touch sensitivity.

18 Claims, 4 Drawing Sheets

(51) Int. Cl.
    *G06F 3/044* (2006.01)
    *G02F 1/1362* (2006.01)
    *G09G 3/36* (2006.01)

(52) U.S. Cl.
    CPC ............ *G06F 3/044* (2013.01); *G06F 3/0412* (2013.01); *G09G 3/3648* (2013.01); *G09G 3/3655* (2013.01); *G09G 2300/0426* (2013.01); *G09G 2300/0809* (2013.01); *G09G 2310/0278* (2013.01); *G09G 2354/00* (2013.01)

(56) References Cited

U.S. PATENT DOCUMENTS

| | | | |
|---|---|---|---|
| 2012/0038585 A1* | 2/2012 | Kim | G06F 3/0412 345/174 |
| 2012/0320326 A1 | 12/2012 | Doi et al. | |
| 2014/0022210 A1* | 1/2014 | Wu | G02F 1/13338 345/174 |
| 2016/0231858 A1* | 8/2016 | Kurasawa | G06F 3/0416 |

FOREIGN PATENT DOCUMENTS

| | | |
|---|---|---|
| CN | 102955636 A | 3/2013 |
| CN | 102955637 A | 3/2013 |
| CN | 103049157 A | 4/2013 |
| CN | 1031049157 A | 4/2013 |
| CN | 202948433 U | 5/2013 |
| CN | 103488009 A | 1/2014 |
| CN | 103955309 A | 7/2014 |
| CN | 203894514 U | 10/2014 |
| CN | 201673895 U | 5/2016 |

OTHER PUBLICATIONS

International Search Report and Written Opinion dated Jan. 21, 2015 issued in corresponding International Application No. PCT/CN2014/085683.

Office Action dated Aug. 25, 2016 issued in corresponding Chinese Application No. 201410149104.9.

* cited by examiner

DISPLAY PANEL, DRIVING METHOD THEREOF AND DISPLAY DEVICE

This is a National Phase Application filed under 35 U.S.C. 371 as a national stage of PCT/CN2014/085683 filed on Sep. 1, 2014, an application claiming the benefit to Chinese application No. 201410149104.9 filed on Apr. 14, 2014; the content of each of which is hereby incorporated by reference in its entirety.

FIELD OF THE INVENTION

The present invention relates to the field of display, in particular to a display panel, a driving method thereof, and a display device including the display panel.

BACKGROUND OF THE INVENTION

A touch panel, as the latest information input equipment at present, can realize human-machine interaction easily, conveniently and naturally and provides a new multimedia human-machine interaction mode for people. Due to the advantages of sensitive touch response, supporting multi-point touch and the like, the touch panel greatly meets people's visual and tactile enjoyment.

Generally, a touch panel at least includes a display panel for displaying and a touch panel for touching. At present, touch panels may be classified into add on mode touch panels, on cell touch panels and in cell touch panels according to the structures thereof. In other words, sensing electrodes Rx and driving electrodes Tx are formed inside or outside or on a surface of the display panel. Although touch panels are of various different structures, each panel includes sensing electrodes Rx and driving electrodes Tx connected to corresponding sensing signal lines and driving signal lines, respectively. When a human body touches a touch panel, the touch panel "senses" the touch of the human body by detecting a change in an electric field between a sensing electrode Rx and a driving electrode Tx so as to realize a touch function.

As one of the best liquid crystal display devices in the current liquid crystal display field, Advanced Super Dimension Switch (ADSDS, ADS for short) mode liquid crystal display devices have gradually become popular with consumers due to their wide angle of view, higher contrast ratio, higher resolution and brighter color. In an ADS mode liquid crystal display device having a touch function, capacitor-mutual inductance type "sensing" touch is generally employed, and therefore, a sensing electrode Rx and a driving electrode Tx are generally arranged in such an interlaced manner that the sensing electrode Rx and the driving electrode Tx are at least partially overlapped in an orthographic projection direction. To ensure a normal rate of change in touch capacitance and realize "sensing", in such structure, it is required that facing area between the sensing electrode Rx and the driving electrode Tx cannot be too large, so as to ensure that node capacitance therebetween can meet touch requirements. However, the arrangement manner of the sensing electrodes Rx and the driving electrodes Tx commonly adopted at present is likely to cause too large coupling capacitance therebetween and thus affect the touch sensitivity. Moreover, the sensing electrodes Rx are generally arranged along longitudinal strips of a black matrix (for the current color filter substrate, the width of longitudinal strips is less than that of transverse strips). As the narrow longitudinal strips in the black matrix cannot completely cover the pattern of the sensing electrodes Rx, the sensing electrodes Rx will impede image display in the normal display condition, so that the display effect is influenced.

Therefore, how to improve touch sensitivity and improve image display effect has become a technical problem to be urgently solved at present.

SUMMARY OF THE INVENTION

An objective of the present invention is to provide a display panel, a driving method thereof, and a display device including the display panel. In the display panel, by arranging driving electrodes and common electrodes in a same layer and using a redundant data line structure to electrically connect the driving electrodes in a same column to each other, the ground capacitance of the driving electrodes is decreased, and the touch sensitivity is improved; meanwhile, by arranging the sensing electrodes within a coverage area of wider strips in a black matrix (i.e., transverse strips in the black matrix), the image display effect is improved.

A technical solution employed to solve the technical problem of the present invention is a display panel, including an array substrate and a color filter substrate, wherein the array substrate is provided with first electrodes and second electrodes, the color film substrate is provided with third electrodes, the first electrodes and the second electrodes are arranged in a same layer, the first electrodes and the second electrodes are alternately arranged in parallel at intervals and electrically isolated from each other, and the second electrodes and the third electrodes are arranged correspondingly in space.

Preferably, the first electrodes include a plurality of sub-electrodes arranged in multiple rows and multiple columns, the sub-electrodes in a same column are electrically connected to each other, the sub-electrodes in different columns are electrically isolated from each other; and an extension direction of the second electrodes is the same as an arrangement direction of rows of the sub-electrodes of the first electrodes, and the plurality of second electrodes are electrically connected to each other.

Preferably, the sub-electrodes in a same column are electrically connected to each other through a first electrode connecting line, and an extension direction of the first electrode connecting lines is perpendicular to the arrangement direction of the rows of the sub-electrodes of the first electrodes.

Preferably, an insulating layer is provided between the first electrode connecting lines and the first and second electrodes, insulating layer via holes are formed in regions of the insulating layer corresponding to the first electrodes, each first electrode connecting line is configured to have at least two parallel-connected branch lines in the region corresponding to the first electrode, the branch lines are electrically connected to the first electrode through the insulating layer via hole; and each first electrode connecting line is configured to have only one branch line in a region corresponding to the second electrode, and the branch line is electrically isolated from the second electrode by the insulating layer.

Preferably, the array substrate includes a plurality of data lines, the first electrode connecting lines and the data lines are arranged alternately at intervals, and an extension direction of the data lines is the same as that of the first electrode connecting lines.

Preferably, the first electrode connecting lines and the data lines are arranged in a same layer, and are formed from a same material in a same patterning process.

Preferably, the array substrate is further provided with gate lines, which are intersected, in different planes, with the first electrode connecting lines and the data lines so that the array substrate is divided into a plurality of sub-pixel regions, in each of which a thin film transistor is provided, in the sub-pixel regions on both sides of a same data line, the thin film transistors in the sub-pixel regions in two adjacent rows are diagonally arranged, sources of the diagonally arranged thin film transistors are electrically connected to a same data line while gates thereof are electrically connected to different gate lines.

Preferably, each sub-pixel region is further provided therein with a pixel electrode, which is electrically connected to a drain of the thin film transistor in the sub-pixel region; the first electrodes and the second electrodes are disposed above the pixel electrodes, and the second electrodes are at least partially overlapped with the pixel electrodes in an orthographic projection direction.

Preferably, the color filter substrate further includes a black matrix and a color film layer, the black matrix is of a grid structure formed by intersecting strips having unequal widths, the third electrodes are arranged on one side of the black matrix away from the color filter substrate and arranged on the strips having a larger width, and the plurality of third electrodes are electrically connected to each other through a third electrode connecting line.

Preferably, a horizontal gap between the adjacent first electrode and third electrode is a width of one sub-pixel region in a direction perpendicular to the arrangement direction of rows of the first electrodes.

There is provided a display device, including a display panel, wherein the display panel is the display panel described above.

There is provided a driving method for a display panel, the display panel including an array substrate and a color filter substrate, wherein the array substrate is provided with first electrodes and second electrodes, the color film substrate is provided with third electrodes, the first electrodes and the second electrodes are arranged in a same layer, the first electrodes and the second electrodes are alternately arranged in parallel at intervals and electrically isolated from each other; the second electrodes and the third electrodes are arranged correspondingly in space, and the driving method includes the step of: time division multiplexing the first electrodes to serve as a part of common electrodes during display and serve as driving electrodes during touch.

Preferably, the first electrodes include a plurality of sub-electrodes arranged in multiple rows and multiple columns, the sub-electrodes in a same column are electrically connected to each other through a first electrode connecting line, the sub-electrodes in different columns are electrically isolated from each other; the plurality of second electrodes are electrically connected to each other, and the plurality of third electrodes are electrically connected to each other through a third electrode connecting line; and the step of time division multiplexing the first electrodes to serve as a part of common electrodes during display and serve as driving electrodes during touch further includes: in a first stage, providing a common reference voltage to the first electrodes and the second electrodes; and in a second stage, providing a touch driving signal to the first electrodes, and providing a touch sensing signal to the third electrodes.

Preferably, the array substrate includes a plurality of data lines, the first electrode connecting lines and the data lines are arranged alternately at intervals; the array substrate is further provided with gate lines, which are intersected, in different planes, with the first electrode connecting lines and the data lines so that the array substrate is divided into a plurality of sub-pixel regions, in each of which a thin film transistor is provided, in the sub-pixel regions on both sides of a same data line, the thin film transistors in the sub-pixel regions in two adjacent rows are diagonally arranged, and the step of providing a common reference voltage further includes: in the first stage, outputting a data signal to sources of the thin film transistors in two adjacent columns through a same data line, and outputting a scanning signal to gates of the thin film transistors in adjacent rows through different gate lines; and the step of providing a touch sensing signal further includes: in the second stage, outputting a driving signal to the first electrodes in a column through the first electrode connecting line, and outputting a sensing signal to the third electrodes through the third electrode connecting line.

Preferably, length of time of the first stage is larger than or equal to that of the second stage, and the sum of the length of time of the first stage and the length of time of the second stage is equal to length of time of a frame period.

The present invention has the following beneficial effects: in the display panel provided by the present invention, without adding a process step, by performing rectangular segmentation on the original plate-shaped common electrodes, it is ensured that common electrodes used during display and driving electrodes used during touch are electrically isolated from each other; in addition, he driving electrodes are connected by redundant data lines, the requirements for a touch function and a display function can be met simultaneously, and a display device comprising the display panel has a good image display effect and a higher touch sensitivity.

BRIEF DESCRIPTION OF THE DRAWINGS

The drawings, constituting a part of the description, are used for providing further understanding of the present invention and for explaining the present invention together with the following specific implementations, rather than limiting the present invention. In the drawings.

REFERENCE NUMERALS

1: Array substrate; 11: First substrate; 12: Thin film transistor; 13: First electrode; 131: First electrode connecting line; 14: Second electrode; 15: Insulating layer via hole; 16: Pixel electrode; 17: Gate line; 18: Data line; 2: Color filter substrate; 21: Second substrate; 22: Black matrix; 23: Color filter layer; 24: Third electrode; 241: Third electrode connecting line; 3: Liquid crystal layer; 31: Liquid crystal molecule; 41: Gate driver; 42: Source driver; 43: Voltage converter; 44: Emitter; 45: Touch controller

DETAILED DESCRIPTION OF THE EMBODIMENTS

The specific implementations of the present invention will be described in details below with conjunction with the drawings. It should be understood that the specific implementations described herein are merely for describing and explaining the present invention rather than limiting the present invention.

According to one aspect of the present invention, there is provided a display panel, including an array substrate and a color filter substrate, wherein the array substrate is provided with first electrodes and second electrodes, the color filter substrate is provided with third electrodes, the first electrodes and the second electrodes are arranged in a same layer, the first electrodes and the second electrodes are alternately arranged at intervals and electrically isolated from each other, and the second electrodes and the third electrodes are correspondingly arranged in space.

According to another aspect of the present invention, there is provided a display device, including a display panel, wherein the display panel is the display panel described above.

According to still another aspect of the present invention, there is provided a driving method for a display panel, the display panel including an array substrate and a color filter substrate, wherein the array substrate is provided with first electrodes and second electrodes; the color filter substrate is provided with third electrodes, the first electrodes and the second electrodes are arranged in a same layer, the first electrodes and the second electrodes are alternately arranged at intervals and electrically isolated from each other, the second electrodes and the third electrodes are correspondingly arranged in space; and the driving method includes: time division multiplexing the first electrodes to serve as a part of common electrodes during display and serve as driving electrodes during touch.

In an embodiment of the present invention, a display panel has an in cell touch panel and may be applied to an ADS type liquid crystal display device.

Figure 1:
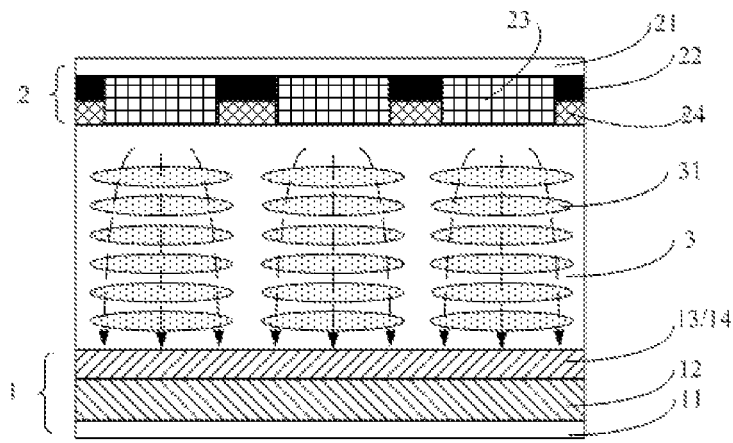
FIG. 1 is a sectional view of a display panel according to an embodiment of the present invention.
Figure 2:
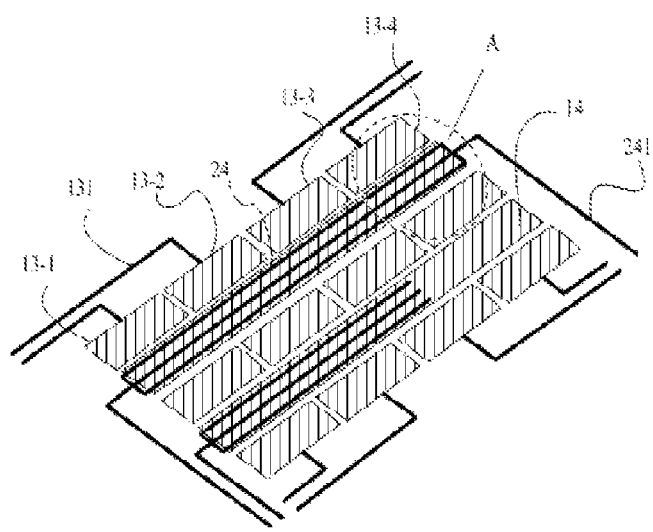
FIG. 2 is a schematic diagram showing relative position of electrodes obtained by orthographically projecting driving electrodes, sensing electrodes and common electrodes in FIG. 1.

As shown in FIGS. 1 and 2, the display panel includes an array substrate 1 and a color filter substrate 2. The array substrate 1 includes a first substrate 11 and first electrodes 13 and second electrodes 14 disposed above the first substrate 11. The color film substrate 2 includes a second substrate 21 and third electrodes 24 disposed above the second substrate 21. The first electrodes 13 and the second electrodes 14 are arranged in a same layer. The first electrodes 13 and the second electrodes 14 are alternately arranged in parallel at intervals and electrically isolated from each other. The second electrodes 14 and the third electrodes 24 are arranged correspondingly in space. The expression "arranged correspondingly in space" means that the second electrodes 14 included in the array substrate 1 and the third electrodes 24 included in the color filter substrate 2 are arranged opposite to each other. In this embodiment, the first electrode 13 may be time-division multiplexed. Specifically, the first electrodes 13 may be used as a part of common electrodes Vcom providing a common voltage for the array substrate during display, and as driving electrodes Tx during touch. The second electrodes 14 may be used as a part of common electrodes Vcom providing a common voltage for the array substrate during display. The third electrodes 24 may be used as sensing electrodes Rx during touch.

As shown in FIG. 2, the first electrodes 13 include a plurality of sub-electrodes arranged in multiple rows and multiple columns. The sub-electrodes in a same column are electrically connected to each other, while the sub-electrodes in different columns are electrically isolated from each other. An extension direction of each second electrode 14 is the same as an arrangement direction of rows of the sub-electrodes of the first electrodes 13. The plurality of second electrodes 14 are electrically connected to each other. In this embodiment, the arrangement direction of rows of the sub-electrodes of the first electrodes 13 refers to a direction in which the sub-electrodes are distributed continuously. In FIG. 2, the arrangement direction of rows of the sub-electrodes of the first electrodes 13 are arranged refers to a direction in which the sub-electrodes are arranged along a gap region formed between adjacent second electrodes 14. Specifically, as shown in FIG. 2, the sub-electrodes in a same column are electrically connected to each other through a first electrode connecting line 131, and an extension direction of the first electrode connecting line 131 is perpendicular to the arrangement direction of rows of the sub-electrodes of the first electrodes 13 (FIG. 2 further shows a wiring direction of portions at two ends of the first electrode connecting line 131 on an edge of a display region, and this wiring direction is parallel to the direction in which the rows of the sub-electrodes are arranged).

Figure 5:
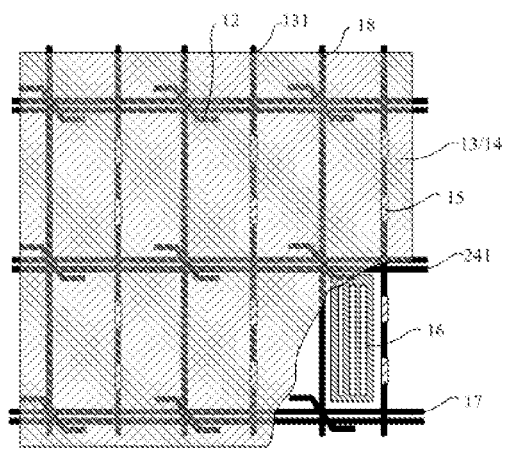
FIG. 5 is a planar diagram of a pixel distribution according to an embodiment of the present invention.

In this embodiment, as shown in FIG. 1, the color filter substrate 2 further includes a black matrix 22 and a color filter layer 23. The black matrix 22 is of a grid structure formed by intersecting strips (including longitudinal strips and transverse strips) having unequal widths, and the width of the transverse strips is larger than that of the longitudinal strips. The third electrodes 24 are arranged on a side of the transverse strips of the black matrix 22 away from the color film substrate, and are electrically connected to each other. As shown in FIGS. 2 and 5, the third electrodes 24 are electrically connected to each other through a third electrode connecting line 241 (FIG. 2 further shows a wiring direction of portions at two ends of the third electrode connecting line 241 on the edge of the display region). In this case, as the third electrodes 24 are arranged on the transverse strips with a larger width in the black matrix 22, the black matrix 22 can cause the third electrodes 24 to completely fall within the orthographic projection thereof, that is, the black matrix 22 can completely cover the pattern of the sensing electrodes Rx. Therefore, the unfavorable situation in which the sensing electrodes covering the normal display region are likely to block displayed pictures may be reduced or even eliminated.

In addition, in the display panel of this embodiment, as shown in FIG. 1, a liquid crystal layer 3 including a plurality of liquid crystal molecules 31 is provided between the color filter substrate 2 and the array substrate 1.

As shown in FIG. 5, the array substrate 1 includes a plurality of data lines 18. The first electrode connecting lines 131 and the data lines 18 are alternately arranged at intervals, and the extension direction of the data lines 18 is the same as that of the first electrode connecting lines 131. To simplify the process, in fabricating the array substrate, the first electrode connecting lines 131 and the data lines 18 are arranged in a same layer, and are formed from a same material in a same patterning process. For example, both the first electrode connecting lines 131 and the data lines 18 may be formed from molybdenum, aluminum or other metal.

As shown in FIG. 5, the array substrate 1 is further provided with gate lines 17. The gate lines 17 are intersected, in different planes, with both the first electrode connecting lines 131 and the data lines 18, so that the array substrate 1 is divided into a plurality of sub-pixel regions. Each sub-pixel region is provided therein with a thin film transistor 12 (the thin film transistor is a part of the array substrate 1 but not specifically shown in FIG. 1). The thin film transistors 12 in the sub-pixel regions that are respectively located on both sides of a same data line 18 and in two adjacent rows are arranged diagonally (for example, the thin film transistors 12 in the sub-pixel regions on the left side of a data line 18 are all arranged at the lower right corners of the respective sub-pixel regions, while the thin film transistors 12 in the sub-pixel regions on the right side of the same data line 18 are all arranged at the top left corners of the respective sub-pixel regions), and the sources of the diagonally arranged thin film transistors 12 are electrically connected to a same data line 18. Meanwhile, to realize progressive scanning display, the gates of the thin film transistors 12 in the sub-pixel regions that are respectively located on both sides of a same data line 18 and in two adjacent rows (i.e., the diagonally arranged thin film transistors 12) are electrically connected to different gate lines 17.

That is, in this embodiment, the array substrate is of a dual gate structure. Compared to a single gate structure in the prior art in which each of the sources of the thin film transistors in the sub-pixel regions in different columns is required to be connected to one data line, in the dual gate structure in this embodiment, it is only required to arrange one data line between the sub-pixel regions in two adjacent columns, and the data line is electrically connected to the sources of the thin film transistors in the sub-pixel regions on both sides thereof, respectively. Therefore, the data lines that are not connected to the thin film transistors may be used as electrically connecting lines (i.e., the first electrode connecting lines 131 in this embodiment, and may be regarded as redundant data lines). Moreover, as the electronic connecting lines and the data lines are arranged in a same layer and may be formed from a same material in a same patterning process, the array substrate with such structure may be fabricated without adding an additional process step.

Meanwhile, it should be understood herein that the rows and columns in this embodiment are arranged perpendicular to each other, the transverse strips and the longitudinal strips are arranged perpendicular to each other, the rows and the transverse strips are arranged in parallel, and the columns and the longitudinal strips are arranged in parallel. In practical applications, the specific directions of the rows and columns as well as the transverse strips and longitudinal strips are not limited, as long as it is ensured that the rows and columns are arranged perpendicular to each other, and the transverse strips and the longitudinal strips are arranged perpendicular to each other.

In this embodiment, referring to FIG. 5, each sub-pixel region of the array substrate is further provided therein with a pixel electrode 16 (the pixel electrode is a part of the array substrate 1 but not specifically shown in FIG. 1). The pixel electrode 16 is electrically connected to the drain of the thin film transistor 12 in this sub-pixel region. The first electrodes 13 and the second electrodes 14 are disposed above the pixel electrodes 16, and the second electrodes 14 are at least partially overlapped with the pixel electrodes 16 in an orthographic projection direction. In this embodiment, the pixel electrodes 16 are slit-shaped (hence also referred to as "slit electrodes"). In this embodiment, one second electrode 14 serving as the common electrode Vcom may pass through a plurality of sub-pixel regions. Moreover, the second electrodes 14 serve as one part of the common electrodes, the first electrodes 13 serve as the other part of the common electrodes during a display time period, and the two parts of the common electrodes together form an approximately plate-shaped electrode layer. In this embodiment, the common electrodes provide an electric field to the liquid crystal layer 3 sandwiched between the array substrate 1 and the color film substrate 2 together with the pixel electrodes; and the liquid crystal molecules 31 are driven by potential applied to the pixel electrodes in the sub-pixel regions, and thus the image display is realized. As both the common electrodes and the pixel electrodes 16 are arranged in the array substrate 1, a multi-dimensional electric field may be formed by an electric field generated by the edges of the slit electrodes and an electric field generated between the slit electrode layer and the plate-shaped electrode layer.

Figure 4:
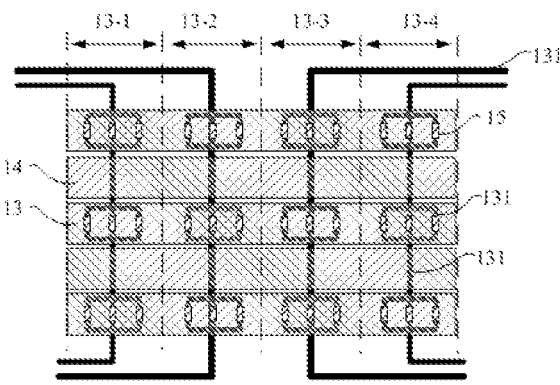
FIG. 4 is a connection diagram of driving electrodes according to an embodiment of the present invention.

It can be easily understood that as each thin film transistor comprises a gate as a control terminal and a source/drain as an input/output terminal, to ensure the normal operation of each terminal, a gate insulating layer may be provided between the gate and the source/drain, and a passivation layer or a planarization layer may be provided between the thin film transistor and the pixel electrode. Accordingly, in this embodiment, an insulating layer (not shown in FIGS. 4 and 5) is provided between the first electrode connecting lines 131 and the first and second electrodes 13 and 14. Insulating layer via holes 15 are formed in regions of the insulating layer corresponding to the first electrodes 13. Each of the first electrode connecting lines 131 is configured to have at least two parallel-connected branch lines in the regions corresponding to the first electrode 13, and the branch lines are electrically connected to the first electrode 13 through the insulating layer via holes 15. Each of the first electrode connecting lines 131 is configured to have only one branch line in a region corresponding to the second electrode 14, and the branch line is electrically isolated from the second electrode 14 by the insulating layer. As shown in FIG. 4, in each of the regions corresponding to the first electrodes 13 (driving electrodes Tx), the first electrode connecting line 131 is provided in a full-region conducted manner or a connecting manner of multiple branch lines (for example, three branch lines shown in FIG. 4), so that the resistance inside the driving electrode Tx itself is decreased. In each of the regions corresponding to the second electrodes 14 (common electrodes Vcom), the first electrode connecting line 131 is configured to have only one branch line or few branch lines for electrical connection, so as to decrease the ground capacitance of the driving electrode Tx. In addition, in FIG. 4, each branch line is electrically connected to the driving electrode Tx through only one insulating via hole 15. Of course, as shown in FIG. 5, each branch line may be electrically connected to the driving electrode Tx through two or even more insulating via holes 15.

It should be understood herein that, the insulating layer between the first and second electrodes 13 and 14 and the first electrode connecting lines 131 may play an electrical isolation role, and is generally formed from a transparent material, such as silicon oxide, silicon nitride, hafnium oxide, silicon oxynitride, aluminum oxide or the like. The structures and forming processes of these layers are the same as those in the prior art, and thus will not be repeated here. Meanwhile, as the insulating layer is generally formed from a transparent material, and observation of the planar diagrams of FIGS. 4 and 5 will not be prevented, the insulating layer is omitted in the planar diagrams of FIGS. 4 and 5.

Figure 3:
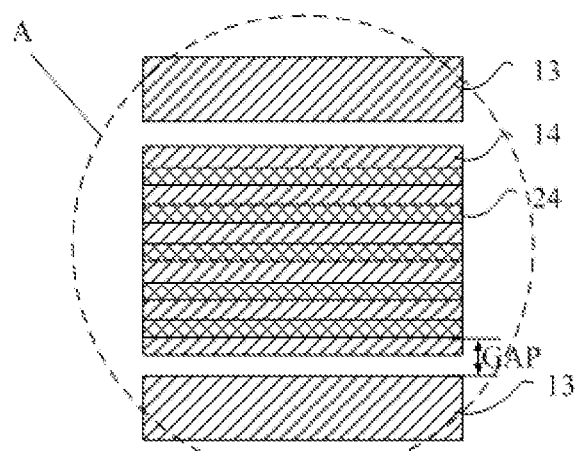
FIG. 3 is a partially enlarged diagram of region A in FIG. 2.

As shown in FIG. 3, in the partially enlarged diagram of the region A in FIG. 2, the width of a horizontal gap GAP between the first electrode 13 (driving electrode Tx) and the third electrode 24 (sensing electrode Rx) directly influences the rate of change in touch capacitance. Preferably, the horizontal gap GAP between the adjacent first electrode 13 and third electrode 24 is equal to the width of one sub-pixel region in a direction perpendicular to the arrangement direction of rows of the first electrodes 13 (i.e., the width of one sub-pixel region in an arrangement direction of the columns) In practical applications, while ensuring the rate of change in touch capacitance, the width of the GAP may be properly adjusted to obtain a rate of change which meets the requirements. Meanwhile, as there is no directly facing area between the driving electrodes Tx and the sensing electrodes Rx, the coupling capacitance between the driving electrodes Tx and the sensing electrodes Rx can be reduced to the largest extent, and the touch sensitivity is improved.

There is provided a driving method for a display panel according to an embodiment of the present invention, based on the structure of the display panel described above, i.e., the display panel includes an array substrate and a color filter substrate, the array substrate is provided with first electrodes and second electrodes, the color film substrate is provided with third electrodes, the first electrodes and the second electrodes are arranged in a same layer, the first electrodes and the second electrodes are alternately arranged in parallel at intervals and electrically isolated from each other, and the second electrodes and the third electrodes are arranged correspondingly in space. The driving method includes: time division multiplexing the first electrodes to serve as a part of common electrodes during display and serve as driving electrodes during touch.

Similarly, based on the structure of the display panel described above, the first electrodes include a plurality of sub-electrodes arranged in multiple rows and multiple columns. The sub-electrodes in a same column are electrically connected to each other through a first electrode connecting line, while sub-electrodes in different columns are electrically isolated from each other. The plurality of second electrodes are electrically connected to each other, and the plurality of third electrodes are electrically connected to each other through a third electrode connecting line. The step of time division multiplexing included in the driving method further includes: in a first stage, providing a common reference voltage to the first electrodes and the second electrodes; and in a second stage, providing a touch driving signal to the first electrodes, and providing a touch sensing signal to the third electrodes.

Based on the structure of the display panel described above, the array substrate includes a plurality of data lines, and the first electrode connecting lines and the data lines are arranged alternately at intervals; the array substrate is further provided with gate lines, which are intersected, in different planes, with the first electrode connecting lines and the data lines so that the array substrate is divided into a plurality of sub-pixel regions; each sub-pixel region is provided therein with a thin film transistor; and the thin film transistors in the sub-pixel regions that are respectively located on both sides of a same data line and in two adjacent rows are diagonally arranged. The step of providing a common reference voltage to the first electrodes and the second electrodes in the first stage further includes: in the first stage, outputting a data signal to the sources of the thin film transistors in two adjacent columns through a same data line, and outputting a scanning line to the gates of the thin film transistors in adjacent rows through different gate lines; and the step of providing a touch driving signal to the first electrodes and providing a touch sensing signal to the third electrodes in the second stage further includes: in the second stage, outputting a driving signal to the first electrodes in a column through the first electrode connecting line, and outputting a sensing signal to the third electrodes through the third electrode connecting line.

In the driving method, the length of time of the first stage (first time period) is greater than or equal to that of the second stage (second time period), and the sum of the first time period and the second time period is equal to a frame period.

Compared to the common electrodes with a plate-shaped structure in an ADS mode liquid crystal display device in the prior art, in this embodiment, the common electrodes are of an approximately plate-shaped grid structure formed by the first electrodes and second electrodes which are alternately provided, and the first electrode (driving electrode Tx) for touch between two adjacent second electrodes is segmented into a plurality of sub-electrodes. The driving electrodes Tx are used for realizing touch together with the third electrodes (sensing electrodes Rx) on one side of the color filter substrate facing the array substrate. In other words, the common electrodes that are plate-shaped as a whole in the prior art are designed to be a pattern formed by arranging a plurality of block electrodes spaced apart from each other, wherein one part of the block electrodes (small block electrodes) are connected through longitudinal first electrode connecting lines located at the positions of the data lines in the prior art so as to serve as driving electrodes Tx during touch, and the driving electrodes Tx realize the touch function together with the sensing electrodes Rx arranged on the color filter substrate. In addition, the other part of block electrodes (big block electrodes) located between adjacent rows of the driving electrodes Tx serve as common electrodes Vcom during display, and a certain voltage value is maintained within the touch time period so as to ensure the touch sensitivity. The common electrodes Vcom and the sensing electrodes Rx extend in the same direction, and are correspondingly arranged in space, so that the coupling capacitance between the driving electrodes Tx and the sensing electrodes Rx can be reduced to the largest extent.

In short, in the display panel of this embodiment, the sensing electrodes Rx are arranged transversely, the driving electrodes Tx are arranged longitudinally, and the sensing electrodes Rx are arranged in the regions of the transverse strips with a larger width in the black matrix (BM); by using a dual gate structure, the thin film transistors in the sub-pixel regions in every two adjacent columns are connected through a first electrode connecting line from the first electrode connecting lines (redundant data lines) which are arranged at intervals; and the driving signal for the driving electrodes Tx is directly input through the first electrode connecting lines. In this way, not only the synchronism of the input of common electrode signals used during display with the input of driving signals used during touch is ensured, but also the resistance of the driving electrodes Tx is greatly decreased. Under the condition that the normal touch function and display function are ensured, the unfavorable situation in which the sensing electrodes Rx are likely to hinder displayed pictures during display may be effectively reduced.

In manufacturing the display panel of this embodiment, it is only required to perform rectangular segmentation on a metal film layer, which is originally used for forming common electrodes, in a patterning process by using a mask plate and to connect driving electrodes by redundant data lines, so that the electrical isolation of the common electrodes used during display from the driving electrodes used during touch can be ensured (that is, the requirements for the touch function and the display function can be met simultaneously), without adding an additional process step. Therefore, the display panel of this embodiment has a simplified manufacturing process and is easy to ensure the yield.

In an embodiment of the present invention, there is provided a display device including the display panel according to the present invention. This embodiment will be described in details by taking an ADS mode liquid crystal display device as an example.

The display device may be any product or component having display function, such as a liquid crystal panel, an electronic paper, a mobile phone, a tablet computer, a TV set, a display, a notebook computer, a digital photo frame, a navigator or the like.

In the ADS mode liquid crystal display device, as a multi-dimensional electric field is formed by an electric field generated by edges of slit electrodes and an electric field generated between the slit electrode layer and the plate-shaped electrode layer, liquid crystal molecules with all orientations between the slit electrodes and right above the electrodes in the liquid crystal layer are enabled to rotate, so that the working efficiency of the liquid crystals is improved and the light transmittance efficiency is increased. The advanced super dimension switch technology may improve the picture quality of the TFT-LCD products, and has the advantages of high resolution, high transmittance, low power consumption, wide angle of view, high aperture ratio, low chromatic aberration, no push Mura and the like.

Figure 6:
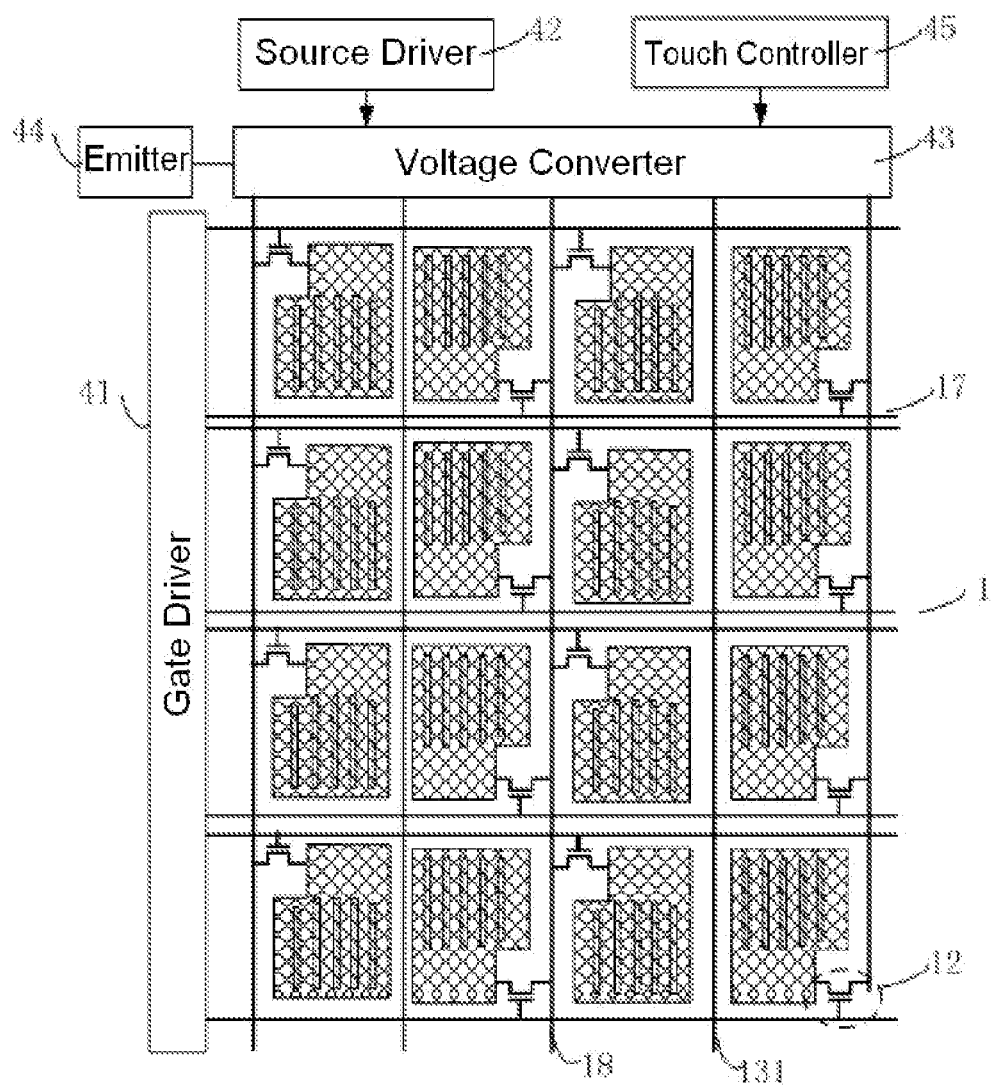
FIG. 6 is a schematic diagram of a structure of a display device according to an embodiment of the present invention.

As shown in FIG. 6, the display panel further includes a gate driver 41, a source driver 42 and a touch controller 45. The gate driver 41 is electrically connected to the plurality of gate lines 17. The gate driver 41 generates a scanning signal voltage and then transmits the scanning signal voltage to the gates of thin film transistors 12 electrically connected to a gate line 17 through the gate line 17, so as to provide a scanning signal to the thin film transistors 12 and thus to turn on the sub-pixel regions of the thin film transistors 12 connected to the gate line 17. The source driver 42 is electrically connected to the data lines 18. The source driver 42 generates a data signal voltage and then transmits the data signal voltage to the sources of the thin film transistors 12 in two columns of sub-pixel regions electrically connected to a data line 18 through the data line 18, so as to obtain the data signal of a displayed picture. The touch controller 45 is electrically connected to the first electrode connecting lines 131. The touch controller 45 generates a touch driving signal and then transmits the touch driving signal to the first electrodes 13 electrically connected to a first electrode connecting line 131 through the first electrode connecting line 131.

In this embodiment, the display device further includes a voltage converter 43, which is arranged to be connected between the source driver 42 and the data lines 18 and between the touch controller 45 and the first electrode connecting lines 131. Therefore, the data signal sent from the source driver 42 is input into the sources of the thin film transistors 12 via the voltage converter 43 and the data lines 18, and the touch controller 45 obtains sensing signals and sends driving signals via the voltage converter 43 and the first electrode connecting lines 131.

It should be understood herein that the touch controller 45 in this embodiment simultaneously integrates touch sensing and touch driving functions. However, in this embodiment, the touch controller 45 is not limited to be of an integrated type. To reduce the cost on chips, the touch controller 45 in this embodiment may also be realized by combining a chip having a function of receiving touch sensing and a chip having a function of sending touch driving.

To control the first electrodes 13 to play a touch function and a display function in different time periods easily, preferably, as shown in FIG. 6, the display device further includes an emitter 44, which is electrically connected to the voltage converter 43 and used for transmitting a control signal to the voltage converter, so as to control the voltage converter 43 to provide different signals in different time periods.

Figure 7:
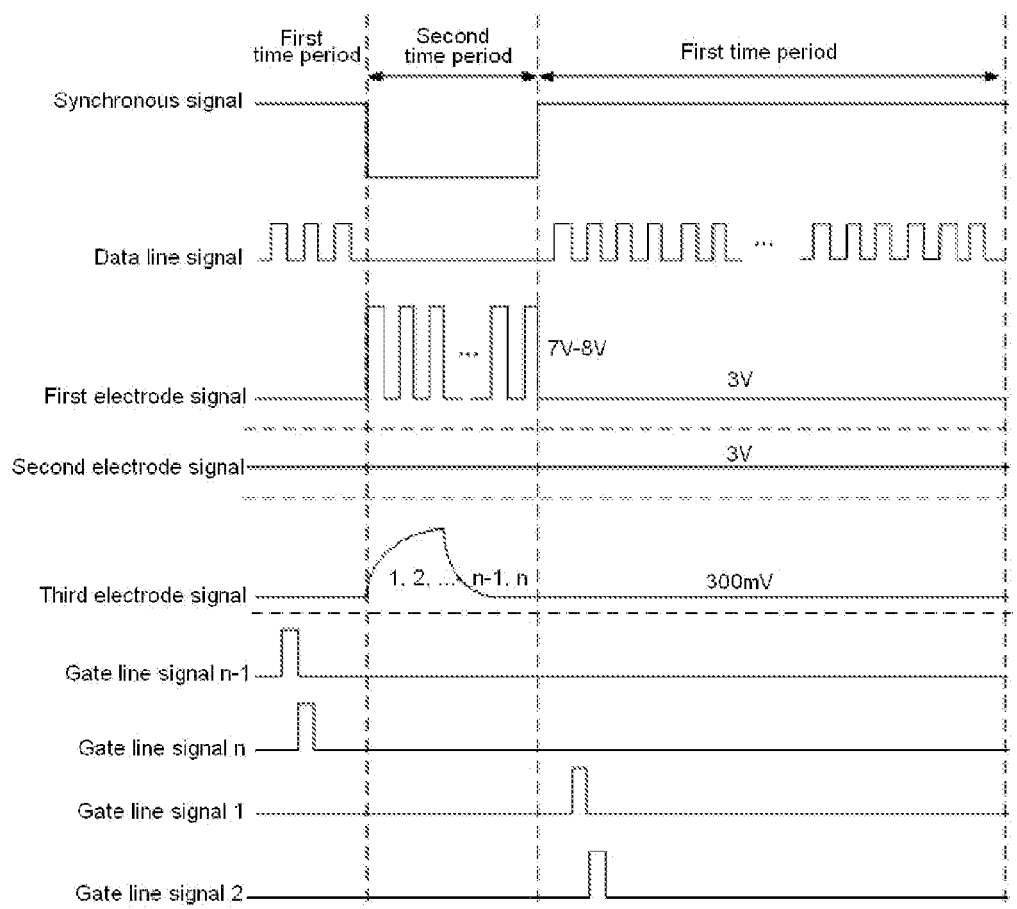
FIG. 7 is a waveform diagram of timing signals according to an embodiment of the present invention.

For example, to ensure normal display of the display device, the time of a frame period of the display device for displaying one frame of picture is divided into two time periods. As shown in FIG. 7, the first time period is a display time period, and the second time period is a touch time period, wherein the first time period is longer than or equal to the second time period and the sum of the first time period and the second time period is equal to the frame period. The voltage converter 43 provides touch signals to the first electrodes 13 in the touch time period, and provides a common voltage signal to the first electrodes 13 and the second electrodes 14 in the display time period, respectively.

Specifically, the voltage converter 43 may provide the common voltage signal from a display driving chip (not shown in FIG. 6) to the first electrodes 13 and the second electrodes 14 in the first time period, so as to display a picture; however, in the second time period, the voltage converter 43 may receive a voltage, which is generated by a touch of a human body and is different from a reference voltage value, from the first electrodes 13 (at this time, the first electrodes 13 are driving electrodes Tx) and the third electrodes 24 (at this time, the third electrodes 24 are sensing electrodes Rx), and performs touch control on the basis of coordinates of a touch position calculated by the emitter 44. In other words, in the operation of the display device, in the first time period, the first electrodes 13 and the second electrodes 14 serving as common electrodes generate an electric field together with the pixel electrodes 16 to drive the liquid crystal molecules 31 to rotate and thus to display a picture. When a human body touches on a display panel, as the electric field formed between the first electrodes 13 and the third electrodes 24 is changed, the touch is sensed in the second time period, and the touch control is realized.

In the process of driving the display device of this embodiment, in the first time period, the first electrodes 13 and the second electrodes 14 serve as common electrodes during display. When the gate lines 17 provide scanning signals to the thin film transistors 12, the thin film transistors in different rows in the array substrate 1 are sequentially turned on row by row. Meanwhile, upon receipt of the control signal sent by the emitter 44, the voltage converter 43 receives a common voltage signal from the display driving chip and a data signal from the source driver, then provides a data signal voltage (or gray level signal) to the sources of the thin film transistors 12 through the data lines 18 and provides a common reference voltage to the first electrodes 13 and the second electrodes 14 through the first electrode connecting lines 131 and a common electrode line, respectively. It can be seen from FIG. 7 that the DC voltage value in this time period (display stage) is relatively small (about 3V); meanwhile, the pixel electrodes 16 connected to the drains of the thin film transistors 12 are powered on to form an electric field together with the first electrodes 13 and the second electrodes 14 (the second electrodes 14 and the pixel electrodes are at least partially overlapped in an orthographic projection direction), and the electric field acts on the liquid crystal layer 3 to drive liquid crystal molecules 31 between the array substrate 1 and the color filter substrate 2 to change the rotation direction of the liquid crystal molecules 31, thereby realizing picture display.

In the second time period, the first electrodes 13 in the array substrate 1 serve as driving electrodes Tx during touch. It can be seen from FIG. 7 that in this time period (touch stage), the DC voltage value of the first electrode signal is relatively large (7V-8V). The third electrodes 24 in the color filter substrate 2 serve as sensing electrodes Rx during touch ("1, 2 . . . n-1, n" in the waveform diagram of the third electrode signal in FIG. 7 represents n times of progressive scanning on the third electrodes). The first electrodes 13 and the third electrodes 24 face to each other in a staggered manner in space (without direct facing area), and form a pair of mutual-inductance capacitive electrode plates. Accordingly, the first electrode connecting lines 131 electrically connected to the first electrodes 13 are driving signal lines, and the third electrode connecting lines 241 electrically connected to the third electrodes 24 are sensing signal lines. The sensing electrodes Rx are connected to the touch controller 45 through the sensing signal lines via the voltage converter 43, and the driving electrodes Tx are connected to the touch controller 45 through the driving signal lines via the voltage converter 43. Upon receipt of the control signal sent by the emitter 44, the voltage converter 43 applies touch driving signals to the first electrodes 13 serving as the driving electrodes through the driving signal lines, and detects voltage signals, returned by the sensing signal lines, obtained on the basis of the inductive capacitance between the first electrodes 13 and the third electrodes 24 (at this time, the first electrode 13 and the third electrode 24 are used as two plates of an inductive capacitor respectively). In this process, when a human body touches the touch screen, the electric field of the human body will act on the inductive capacitor to change the capacitance value of the inductive capacitor and thus to further change the voltage value of the obtained voltage signal, so that the voltage signal returned from the sensing signal lines to the voltage converter 43 is changed. According to the change in the voltage signal, the position of the touch point can be determined, thereby realizing touch control.

It should be understood herein that in the first time period, a very weak voltage (300 mV) is applied to the third electrodes 24; and in the second period, the voltage on the second electrodes 14 is maintained at the voltage value in the first time period. Such arrangement reduces the amplitude of change in the reference voltage. As the touch time period is shorter than the display time period, by using the rotation inertia of the liquid crystal molecules, switching from the display time period to the touch time period in one frame period has a small influence on display.

In the display device provided by this embodiment, the emitter 44 works with the voltage converter 43 to realize the above display and touch processes.

It should be understood herein that when a human finger touches the first electrodes or third electrodes in different display regions, as a certain contact area is generally present between the human finger and the display panel, the touch area has continuity (i.e., the area touched by a human is generally no less than a sensing precision). As described above, the first electrodes or the third electrodes serve as driving electrodes or sensing electrodes. As the plurality pixel regions arranged according to a certain rule in the display device ensures that the orthographic projections of the sensing electrodes and the driving electrodes can be alternately arranged at intervals in a continuous manner, the touch effect will not be influenced even though the area touched by human has parts belong to different pixel regions.

The first time period and the second time period may be set according to a specific application environment of the display device and conditions such as a response precision, a touch precision and the like. For example, taking a frequency of 60 Hz as an example, if the frame period of the display device for displaying one frame is 16.7 ms, 12.7 ms may be taken as the display time period, and the other 4 ms may be used as the touch time period. Of course, durations of the display time period and the touch time period may also be properly adjusted according to the processing capacity of an IC chip for control in the display device, and will not be specifically limited herein.

The display device has good image display effect and high touch sensitivity.

It should be understood that the foregoing implementations are merely exemplary implementations used for describing the principle of the present invention, but the present invention is not limited thereto. A person skilled in the art may make various variations and improvements without departing from the spirit and essence of the present invention, and these variations and improvements are also considered to be encompassed within the protection scope of the present invention.

The invention claimed is:

1. A display panel, comprising an array substrate and a color filter substrate, wherein the array substrate is provided with first electrodes and second electrodes, the color filter substrate is provided with third electrodes, the first electrodes and the second electrodes are arranged in a same layer, the first electrodes and the second electrodes are alternately arranged in parallel at intervals and electrically isolated from each other, and the second electrodes and the third electrodes are arranged correspondingly in space; and wherein the first electrodes comprise a plurality of sub-electrodes arranged in multiple rows and multiple columns, the sub-electrodes in a same column are electrically connected to each other, and the sub-electrodes in different columns are electrically isolated from each other; an extension direction of the second electrodes is the same as an arrangement direction of the rows of the sub-electrodes of the first electrodes, and the plurality of second electrodes are electrically connected to each other.

2. The display panel according to claim 1, wherein the sub-electrodes in a same column are electrically connected to each other through a first electrode connecting line, and an extension direction of the first electrode connecting lines is perpendicular to the arrangement direction of the rows of the sub-electrodes of the first electrodes.

3. The display panel according to claim 2, wherein an insulating layer is provided between the first electrode connecting lines and the first and second electrodes, insulating layer via holes are formed in regions of the insulating layer corresponding to the first electrodes, each first electrode connecting line is configured to have at least two parallel-connected branch lines in each region corresponding to the first electrode, the branch lines are electrically connected to the first electrode through the insulating layer via hole; and each first electrode connecting line is configured to have only one branch line in a region corresponding to the second electrode, and the branch line is electrically isolated from the second electrode by the insulating layer.

4. The display panel according to claim 3, wherein the array substrate comprises a plurality of data lines, the first electrode connecting lines and the data lines are arranged alternately at intervals, and an extension direction of the data lines is the same as that of the first electrode connecting lines.

5. The display panel according to claim 4, wherein the first electrode connecting lines and the data lines are arranged in a same layer, and are formed from a same material in a same patterning process.

6. The display panel according to claim 5, wherein the array substrate is further provided with gate lines, which are intersected, in different planes, with the first electrode connecting lines and the data lines so that the array substrate is divided into a plurality of sub-pixel regions, in each of which a thin film transistor is provided, the thin film transistors in the sub-pixel regions that are respectively located on both sides of a same data line and in two adjacent rows are diagonally arranged, sources of the diagonally arranged thin film transistors are electrically connected to a same data line while gates thereof are electrically connected to different gate lines.

7. The display panel according to claim 6, wherein each sub-pixel region is further provided therein with a pixel electrode, which is electrically connected to a drain of the thin film transistor in the sub-pixel region; the first electrodes and the second electrodes are disposed above the pixel electrodes, and the second electrodes are at least partially overlapped with the pixel electrodes in an orthographic projection direction.

8. The display panel according to claim 7, wherein the color filter substrate further comprises a black matrix and a color filter layer, the black matrix is of a grid structure formed by intersecting strips having unequal widths, the third electrodes are arranged on a side of the black matrix away from the color filter substrate and arranged on the strips having a larger width, the plurality of third electrodes are electrically connected to each other through a third electrode connecting line.

9. The display panel according to claim 8, wherein a horizontal gap between the adjacent first electrode and third electrode is a width of one sub-pixel region in a direction perpendicular to the arrangement direction of rows of the first electrodes.

10. A display device, comprising a display panel, wherein the display panel is the display panel according to claim 1.

11. The display device according to claim 10, wherein the sub-electrodes in a same column are electrically connected to each other through a first electrode connecting line, and an extension direction of the first electrode connecting lines is perpendicular to the arrangement direction of the rows of the sub-electrodes of the first electrodes.

12. The display device according to claim 11, wherein an insulating layer is provided between the first electrode connecting lines and the first and second electrodes, insulating layer via holes are formed in regions of the insulating layer corresponding to the first electrodes, each first electrode connecting line is configured to have at least two parallel-connected branch lines in each region corresponding to the first electrode, the branch lines are electrically connected to the first electrode through the insulating layer via hole; and each first electrode connecting line is configured to have only one branch line in a region corresponding to the second electrode, and the branch line is electrically isolated from the second electrode by the insulating layer.

13. The display device according to claim 12, wherein the array substrate comprises a plurality of data lines, the first electrode connecting lines and the data lines are arranged alternately at intervals, and an extension direction of the data lines is the same as that of the first electrode connecting lines.

14. The display device according to claim 13, wherein the first electrode connecting lines and the data lines are arranged in a same layer, and are formed from a same material in a same patterning process.

15. A driving method for a display panel, the display panel comprising an array substrate and a color filter substrate, wherein the array substrate is provided with first electrodes and second electrodes, the color filter substrate is provided with third electrodes, the first electrodes and the second electrodes are arranged in a same layer, the first electrodes and the second electrodes are alternately arranged in parallel at intervals and electrically isolated from each other, the second electrodes and the third electrodes are arranged correspondingly in space;
  wherein the first electrodes comprise a plurality of sub-electrodes arranged in multiple rows and multiple columns, the sub-electrodes in a same column are electrically connected to each other, and the sub-electrodes in different columns are electrically isolated from each other; an extension direction of the second electrodes is the same as an arrangement direction of the rows of the sub-electrodes of the first electrodes, and the plurality of second electrodes are electrically connected to each other; and
  the driving method comprises a step of: time division multiplexing the first electrodes to serve as a part of common electrodes during display and serve as driving electrodes used during touch.

16. The driving method according to claim 15, wherein the sub-electrodes in a same column are electrically connected to each other through a first electrode connecting line, the plurality of third electrodes are electrically connected to each other through a third electrode connecting line, and the step of time division multiplexing the first electrodes to serve as a part of common electrodes during display and serve as driving electrodes during touch comprises: in a first stage, providing a common reference voltage to the first electrodes and the second electrodes; and in a second stage, providing a touch driving signal to the first electrodes, and providing a touch sensing signal to the third electrodes.

17. The driving method according to claim 16, wherein the array substrate comprises a plurality of data lines, the first electrode connecting lines and the data lines are arranged alternately at intervals; the array substrate is further provided with gate lines, which are intersected, in different planes, with the first electrode connecting lines and the data lines so that the array substrate is divided into a plurality of sub-pixel regions, in each of which a thin film transistor is provided, the thin film transistors in the sub-pixel regions that are respectively located on both sides of a same data line and in two adjacent rows are diagonally arranged, and the step of providing a common reference voltage further comprises: in the first stage, outputting a data signal to sources of the thin film transistors in two adjacent columns through a same data line, and outputting a scanning line to gates of the thin film transistors in adjacent rows through different gate lines; and the step of providing a touch sensing signal further comprises: in the second stage, outputting a driving signal to the first electrodes in a column through the first electrode connecting line, and outputting a sensing signal to the third electrodes through the third electrode connecting line.

18. The driving method according to claim 17, wherein length of time of the first stage is greater than or equal to that of the second stage, and the sum of the length of time of the first stage and the length of time of the second stage is equal to length of time of a frame period.

* * * * *